United States Patent [19]

Tribe

[11] 4,399,894
[45] Aug. 23, 1983

[54] PUSH ROD SLACK ADJUSTER

[75] Inventor: Leonard T. Tribe, Ann Arbor, Mich.

[73] Assignee: Kelsey-Hayes Company, Romulus, Mich.

[21] Appl. No.: 293,781

[22] Filed: Aug. 18, 1981

Related U.S. Application Data

[63] Continuation of Ser. No. 11,968, Feb. 14, 1979, abandoned.

[51] Int. Cl.³ .............................................. F16D 65/56
[52] U.S. Cl. ............................... 188/71.9; 188/196 D; 188/196 BA
[58] Field of Search ................. 188/71.9, 72.8, 196 D, 188/196 BA; 192/111 A

[56] References Cited

U.S. PATENT DOCUMENTS

| | | | |
|---|---|---|---|
| 3,871,495 | 3/1975 | Devitt | 188/196 BA |
| 3,900,084 | 8/1975 | Farr | 188/71.9 |
| 3,920,102 | 11/1975 | Ito | 188/71.9 |
| 3,952,844 | 4/1976 | Newstead et al. | 188/72.8 |
| 3,991,859 | 11/1976 | Coulter et al. | 188/71.9 |
| 4,030,577 | 6/1977 | Ogawa et al. | 188/71.9 |
| 4,114,733 | 9/1978 | Knight | 188/196 BA |
| 4,167,989 | 9/1979 | Meyer | 188/71.9 |

*Primary Examiner*—Douglas C. Butler
*Assistant Examiner*—R. R. Diefendorf
*Attorney, Agent, or Firm*—Ralph J. Skinkiss; Ronald W. Wangerow

[57] ABSTRACT

A slack adjuster for axially moved push rods is provided. An axially extending rotating actuating shaft turns a helical, driving cam member that in turn axially displaces a non-rotating driven cam member. The driving and driven helical cam members are located in a housing with the actuating shaft extending out of one end thereof and a threaded push rod extending out of the other end of the housing. A helical return spring is positioned between the driven cam and the inner wall of the housing to bias the cam members together. The push rod is held against rotation internally of the housing by a flange whose periphery is frictionally engaged by the return spring. A nut is threaded onto the rod and engaged by the driven cam member to transmit axial force to the push rod; and relative extension of the push rod from the cam members is accomplished by a one way spring brake acting on the nut and a disc clutch drive between the driving cam and nut. Lost motion is provided to prevent rotation of the nut on the rod during normal push rod clearance, and rotation of the nut on the push rod occurs when excessive push rod clearance occurs.

19 Claims, 8 Drawing Figures

PUSH ROD SLACK ADJUSTER

This is a continuation of application Ser. No. 011,968, filed Feb. 14, 1979, now abandoned.

BACKGROUND OF THE INVENTION

The present invention relates to a new and improved caliper brake having a new and improved automatic adjusting mechanism wherein the brake clearance can be precisely increased or decreased manually from a point exterior of the brake while the brake is in operative position on the vehicle on which it is installed.

A number of designs of rotary cam actuators for caliper brakes have been provided by the prior art and which suffer from a number of adjustment and maintenance difficulties. In the type of actuator with which we are concerned, the brake lining is squeezed against the rotating disc by a threaded post that in turn is engaged by a threaded nut that in turn is axially driven by a rotary cam mechanism. In some of these mechanisms, the rotary drive structure for the cam is in sliding contact with portions of the nut, and when corrosion occurs or dirt enters the structure, the nut may bind to the rotary drive structure so that it may drive the nut in both directions over the threaded post thereby preventing proper clearance adjustment.

In other types of these structures, the connection between the nut and the rotary drive structure is such that the post is held stationary while the nut is adjusted both manually and automatically to control brake clearance. In some of these structures, the nut cannot be backed off manually to increase clearance in the brake without removing it from the vehicle in which it is installed.

In some other types of these brakes mechanisms, it is possible to retract the post to such an extent that the nut becomes jammed onto the threads of the post with such severity that the automatic adjusting portion of the brake slips without making an automatic adjustment of the brake. Where such structures are actuated by air pressure, or other mechanism wherein the actuating lever movement is not proportional to the brake applying movement, the lack of adjustment is not sensed by the driver, and unequal brake applications can occur.

In still other types of these structures, hard to seal passages lead through the housing to the adjustment mechanism and/or the threaded nut extends externally of the housing where corrosion can freeze the nut if rubber diaphragm type covers because damaged or do not seal for any reason.

An object of the present invention, therefore, is the provision of a new and improved automatic adjuster of the above described type which cannot be manually adjusted to a point making the automatic adjusting mechanism become inoperative.

Another object of the present invention is the provision of a new and improved automatic adjuster of the above described type wherein the threaded brake actuating post is engaged by a threaded nut that in turn is moved axially by a rotatable cam mechanism and in which the threaded nut is held against being rotated in a direction which would retract the threaded post.

A still further object of the present invention is the provision of a new and improved caliper brake in which the rotary drive mechanism for the rotary cam is out of sliding engagement with the threaded nut.

Further object and advantages will be apparent to those skilled in the art to which the invention relates.

DESCRIPTION OF THE PREFERRED EMBODIMENTS

The reference numeral 11 indicates generally a cam actuated disc brake constructed in accordance with a first embodiment of the invention. The brake 11 includes a caliper housing 12 that is supported adjacent a rotor 13. The caliper 12 is supported so that it may slide in an axial direction relative to the associated rotor 13 but is held against rotation relative to the rotor.

As is typical with sliding caliper type disc brakes, the caliper 12 has a first leg 14 disposed adjacent to one of the braking surfaces of the rotor 13 and to which a brake pad 15 is affixed in any suitable manner. A second leg 16 of the caliper 12 is disposed adjacent the opposite rotor braking surface. An actuating mechanism, indicated generally by the reference numeral 17 and an automatic adjusting mechanism, indicated generally by the reference numeral 18, are associated with the caliper leg 16. These mechanism act upon a brake pad 19 that is disposed in opposition to the brake pad 15 and which cooperates with the adjacent braking surface of the rotor 13.

Figure 1:
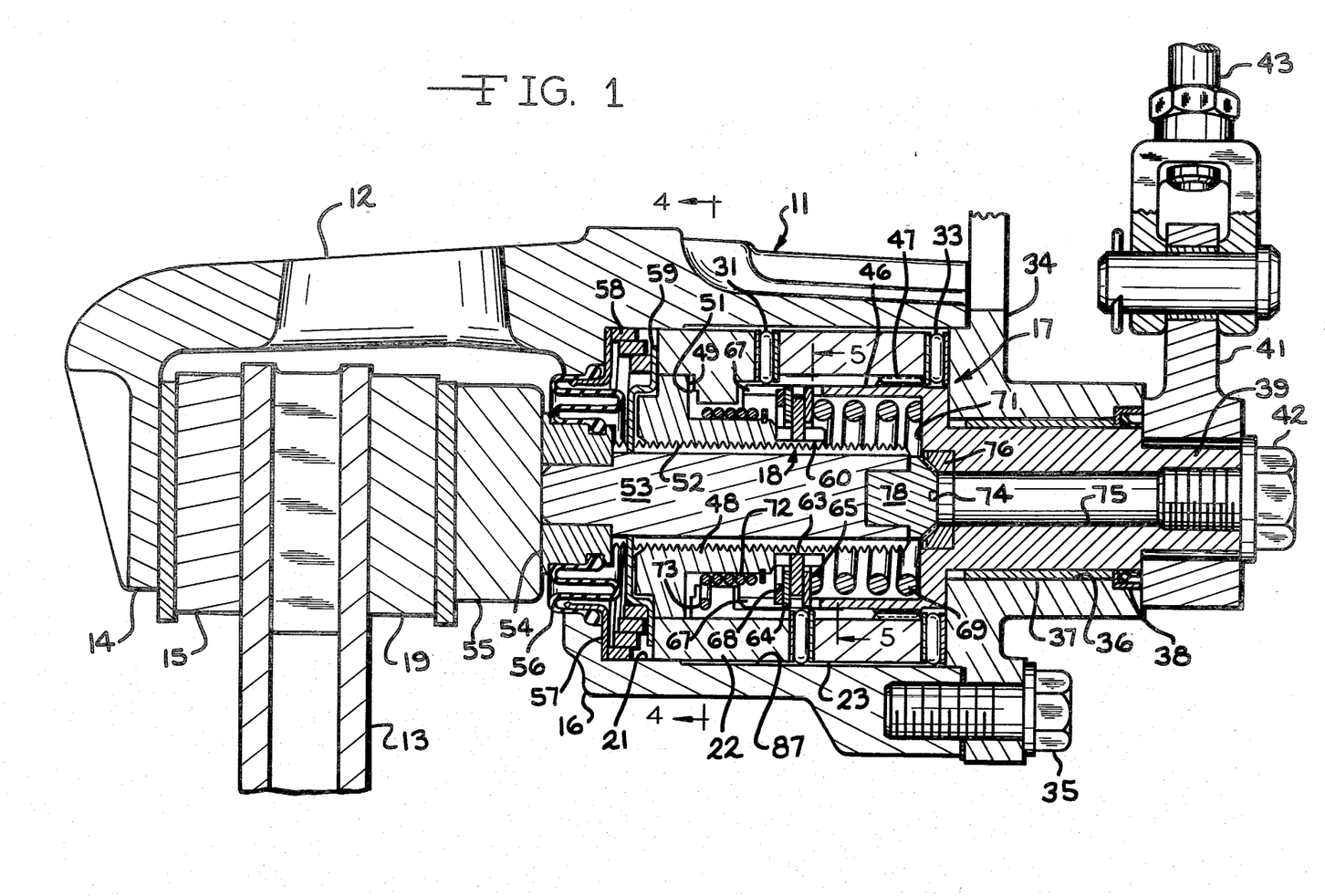
FIG. 1 is a longitudinal cross sectional view through a rotary cam actuated disc brake incorporating principles of the present invention.
Figure 2:
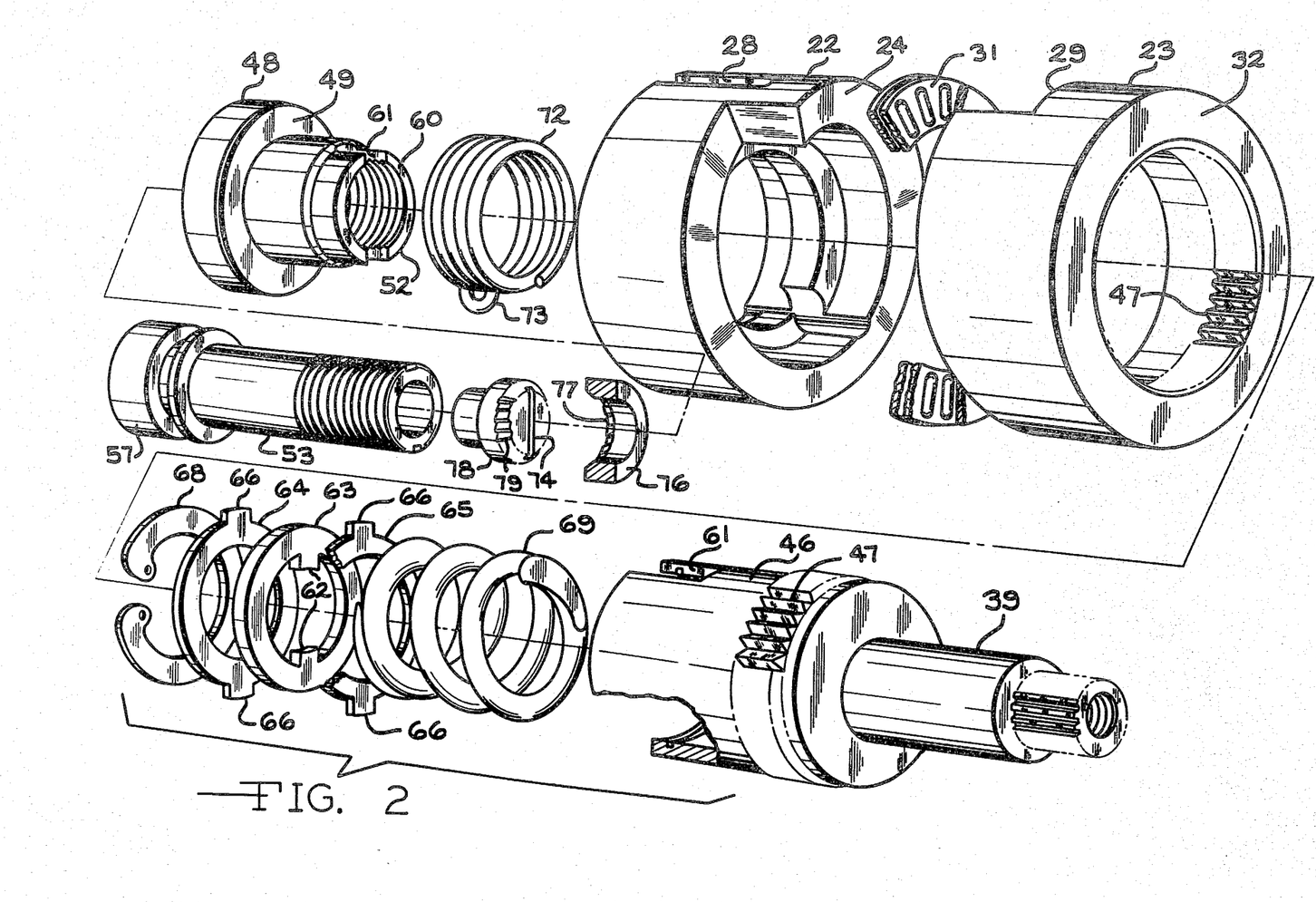
FIG. 2 is an exploded view of portions of the automatic adjusting mechanism shown in FIG. 1.

The caliper leg 16 is formed with an elongated bore 21 in which a nonrotatable cam element 22 and a rotary cam element 23 are supported. The nonrotatable cam element 22 has a helical cam surface 24 formed on its rearward most face (FIG. 2). The cam element 22 is supported within the bore 21 for axial movement but is held against rotation. This is accomplished by means of a staking pin 25 (FIGS. 2 and 4) that is held in place at the base of a tapped opening 26 of the caliper leg 16. The pin 25 has a key portion 27 that extends into an elongated groove 28 formed in the cam member 22.

The cam element 23 also has a helical cam surface 29 (FIG. 2) that is complementary in shape to the cam surface 24 and which is juxtaposed to it. A suitable antifriction bearing 31 is interposed between the cam surfaces 29 and 24 so as to limit the amount of friction between these surfaces.

The face 32 of the cam element 23 opposite its cam surface 29 is engaged with an antifriction bearing 33 which, in turn, bears against a closure plug 34 that is affixed across the open end of the bore 21 by means of machine screws 35.

The closure plug 34 is formed with an axially extending bore 36 in which a sleeve bearing 37 and seal 38 are supported. An actuating shaft 39 extends through the bore 36 and is rotatably supported by the bearing 37. An actuating lever 41 is nonrotatably affixed to the actuating shaft 39 by a spline and machine screw 42. The actuating lever 41 is pivotably connected to a rod 43 of an actuating air motor 44 (FIG. 3) that is fixed by means of a bracket 45 relative to the caliper assembly 12. The actuating motor 44 affects rotation of the actuating shaft 39 via the lever 41, as will become apparent.

The actuating shaft 39 has a generally hollow cylindrical section 46 that extends into the bore 21 and which extends radially inwardly of the cam element 23. A spline connection 47 rotatably connects the actuator shaft portion 46 with the cam element 23 to effect simultaneous rotation of these components.

The automatic adjusting mechanism 18 includes an annular nut 48 having a shoulder 49 for abutment with a corresponding shoulder 51 formed on the cam element 22. Internal threads 52 of the nut 48 are engaged with threads of a male threaded member 53. The male threaded member 53 has a reduced diameter end carrying a collar 54 that is engaged with a load distributor 55 which bears against the brake pad 19. A suitable boot or dust seal 56 encircles the collar 54 and is held in place relative to the open end of the caliper bore 21 by means of a retaining ring 57 that is positioned against the inner end of the bore 21 to seal the internal portions of the brake actuating mechanism 17 and automatic adjusting mechanism 18. A helically wound compression spring 58 is positioned between the seal retaining ring 57 and a hat shaped combination bearing plate and dirt seal 59, the radially outer portion of which bears against the cam 22 to effect brake retraction, as will become apparent.

The nut 48 has an axially extending projection 60 that is slotted, as at 61, to receive one or more tangs 62 of a clutch plate 63. There is a predetermined clearance of approximately five degrees of rotation between the tangs 62 and sides of the slots 61 which clearance establishes the normal running clearance of the brake 11, as will become apparent.

The clutch plate 63 is received between a pair of clutch plates 64 and 65 which, in turn, have a tanged connection to the hollow cylindrical section 46 of the actuating shaft portion 39. The tanged connection comprises tangs 66 formed on the clutch plates 64 and 65 (FIG. 5) and slots 67 formed in the hollow cylindrical section 46. A snap ring 68 bears against the clutch plate 64 and is affixed within a groove in the hollow cylindrical section 46. A large compression spring 69 bears against the clutch plate 65 and a shoulder 71 formed at the base of the hollow cylindrical section 46. The spring 69 presets the pressure existing between the clutch plates 64 and 65 and the clutch plate 63 and determines the torque at which this clutch will slip, as will become apparent.

Figures 3, 4, 5, 6:
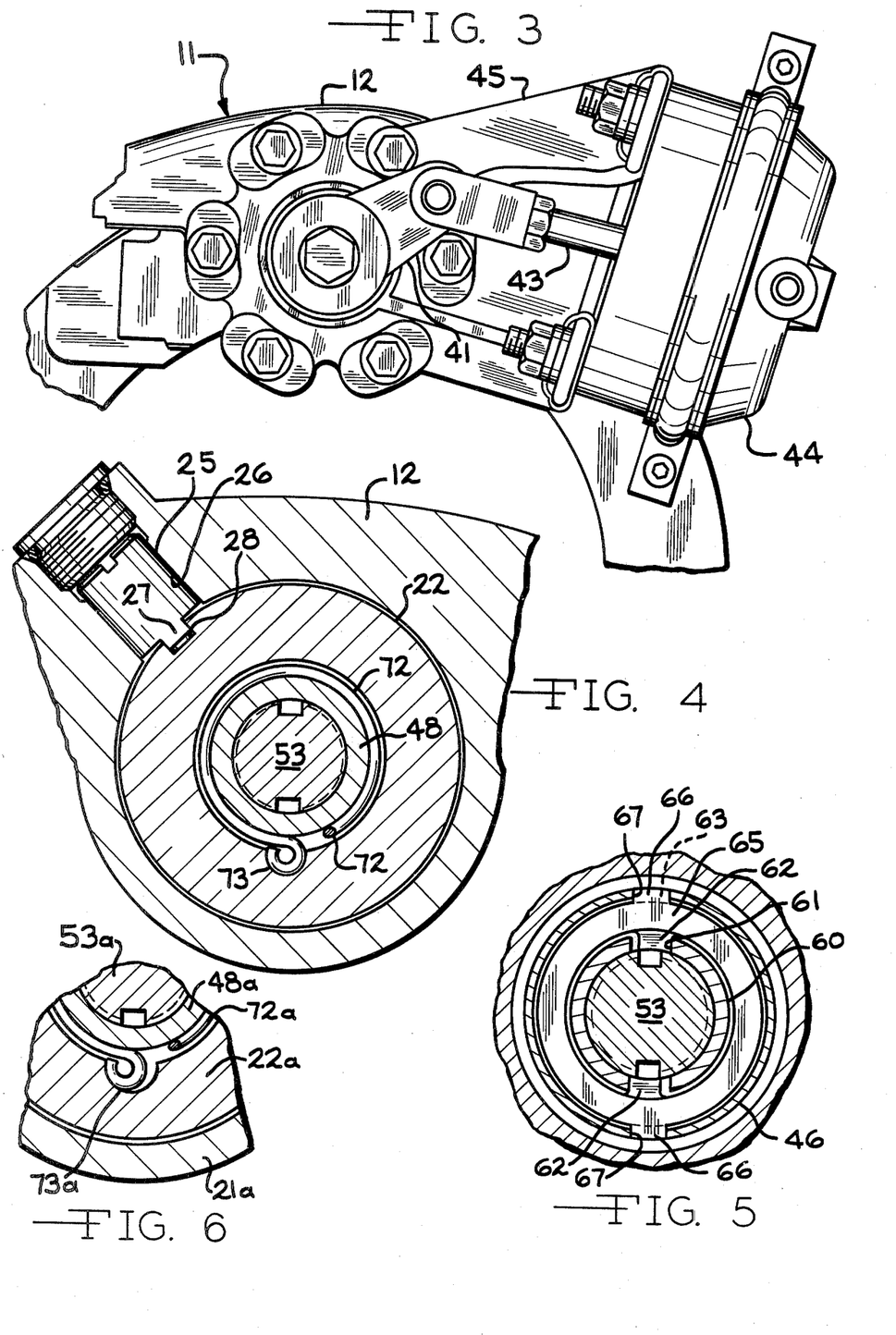
FIG. 3 is an elevational view of the embodiment shown in FIGS. 1 and 2 and showing an air pressure actuator for the brake.
FIG. 4 is a cross sectional view taken approximately on the line 4—4 of FIG. 1.
FIG. 5 is a fragmentary cross sectional view taken approximately on the line 5—5 of FIG. 1, and showing a lost motion connection in the automatic adjusting mechanism.
FIG. 6 is a fragmentary enlarged view of another embodiment of lost motion connection.

It will be seen that forward rotation of the actuating shaft 39 will produce an advancing rotation of the nut 48 through the clutch plate 63, except during the five degrees of lost motion clearance between the tangs 62 and the sides of the slots 61 in the nut. In order that this five degrees of lost motion will occur at the start of each actuation, means are provided for preventing the nut from being rotated backwardly when the actuating shaft 39 is rotated backwardly. In the embodiment shown in FIGS. 1–5, this is accomplished by a spring brake 72 that encircles the nut 48 and which has a projection 73 fixed relative to the nonrotating cam element 22. The spring brake 72 acts as a one way brake so that the nut 48 may be rotated in the forward direction, but not in the reverse direction. During initial reverse rotation, the reactive forces produced by the brake lining of the rotor 13 hold the shoulder 49 of the nut in engagement with the shoulder 51 of the actuating cam element 22 to prevent rotation of the nut. Thereafter, the nut 48 moves out of engagement with the shoulder 51 and rotation of the nut 48 is prevented by the spring brake. During this time, the shoulder 49 of the nut moves away from the shoulder 51 while the forward face of the nut 48 moves into engagement with the washer 59 which thereafter positively retracts the nut and push rod 53 to leave running clearance in the brake. In the embodiments shown in FIGS. 1–5, there is a clearance of 0.015 inch between the shoulders 49 and 51 at this time. Throughout this deactuating movement of the shaft 39, the clutch discs 64 and 65 are rotated clockwise as seen in FIG. 5 to move the tang 62 of the clutch disc 63 into engagement with the trailing side edges of the slot 61. During the next actuation, therefore, the tangs 62 will move the full five degrees of counter clockwise rotation as seen in FIG. 5 before they engage the leading side edges of the slot 61. The clearance between the shoulders 49 and 51 previously referred to prevents binding between the nut and the cam portion 22 during automatic adjustment.

One of the problems which occur with prior art slack adjuster constructions is that they do not allow access to the threaded rod 53 after the brake is installed. In the construction so far described, the nonrotating cam member 22 is positioned adjacent the nut 48, and the rotating portion 23 of the cam is positioned outwardly of the nonrotating portion 22 of the cam. With this construction, the rotating portion 23 can be driven by an axially extending shaft projecting through the outer wall of the actuator away from the brake rotor and the actuating and adjusting mechanism is positioned between the closure plug 34 and the inner seal structure of the brake. This seal structure includes the hat shaped washer 59. It is a feature of the present invention that the outer periphery of the washer 59 is always held into sliding engagement with the nonrotating cam element 22 while the center portion of the washer 59 has a sliding nonrotational close fit with the actuating rod 53. It will now be seen that the washer 59, therefore, provides a metal sliding seal which protects the inner workings of the brake while also providing a friction clutch for preventing rotation of the push rod 53 by the nut 48. In some prior art designs, it is necessary to nonrotatably hold the push rod 53 by sliding structure located in the space adjacent the rotor 13 where the sliding structure is bathed in water and dirt.

According to a further feature of the present invention, the running clearance of the brake can be adjusted while the brake is in position over the rotor by rotating the push rod 53 relative to the nut 48. This is accomplished by a torque transmitting surface 74, which in the present instance is a screwdriver slot, fixed in the end of the actuating rod 53. Access to the screwdriver slot 54 is had through a passageway 75 that extends through the center of the actuating shaft 39 and the outer end of which is closed off by machine screw 42.

In some instances it is possible for a mechanism to unknowingly back off the actuating rod 53 to such an extent that it is jammed up against the actuating shaft 39. When this is done, the bind between the actuating rod 53 and the shaft will be such that the clutch plates 63, 64 and 65 slip without adjusting the nut 48. This, of course, will defeat the self adjusting feature of the brake.

In the embodiment shown in FIGS. 1–5, this is prevented by providing teeth on the abutting surfaces of the rod and the surface which it abuts which prevent the rod from being rotated into a jammed condition. In the embodiment shown, it is accomplished by providing an annular ring 76 which surrounds the passageway 75 and which has square teeth 77 on its abutment surface. The end of the rod 53 has an abutment 78 pressed therein for engaging the square teeth, and its abutment surface is provided with ratchet teeth 79, the flat sides of which will engage the flat side of the square teeth 77 to limit the retraction of the rod 53 toward the annular ring 76. The ratchet teeth 79, however, permit the rod 53 to be easily rotated in an advancing direction away from the annular ring 76 by the automatic adjusting mechanism.

Relining of the brakes is made simple by the present invention. The machine screw 42 is removed from the passageway 75, and a screwdriver is inserted into the slot 74 to turn the rod 53 counterclockwise as seen in FIGS. 4 and 5. This backs the adjustment rod 53 out of the nut 48 to provide clearance between the pads 15 and 19 and the rotor 13. New pads 15 and 19 are inserted, the brake assembly is put back on the vehicle and the adjustment rod 53 is rotated clockwise until the brake pads are brought adjacent the rotor 13. During rotation of the adjustment rod 53 by the screwdriver, its motion is opposed by sliding friction between the washer 59 and the clamping action of spring 58 on the nonrotatable cam member 22. This frictional engagement will hold the adjustment rod 53 in its adjusted position, and the clutch plates 63, 64 and 65 are operative thereafter to rotate the nut 48 relative to the adjuster rod 53. The machine screw 42 is reinstalled to seal off the mechanism from water and dirt.

OPERATION OF THE EMBODIMENT OF FIGS. 1–5

The figures illustrate the brake 11 in a released position. To actuate the brake, the piston rod 43 is extended so as to rotate the lever 41 and shaft 39 in a counterclockwise direction as seen in FIGS. 3–5. This effects rotation of the cam element 23 relative to the cam element 22 to exert an axial force on the cam element 22. The cam element 22 is, therefore, shifted to the left along with the nut 48 and threaded member 53 to compress the spring 58. The brake pad 19 will then be brought into engagement with the associated braking surface of the rotor 13 and effect a reactive force on the caliper 12 to slide it toward the right as viewed in FIG. 1. The brake pad 15 will, therefore, be brought into engagement with the opposing braking surface of the rotor 13.

At the time the cam element 23 is rotated, the clutch plates 64 and 65 will also effect rotation of the clutch plate 63. Assuming that insufficient lining wear has taken place to require adjustment, the tangs 62 of the clutch plate 63 will merely traverse the slots 61 and no rotation of the nut 48 will result.

Assuming, however, that sufficient lining wear has taken place so as to necessitate adjustment, the clutch plate 63 will take up the clearance in the slots 61 and will rotate the nut 48 in an adjusting direction. This rotation is permitted by slippage of the one way spring brake 72. The rotation of the nut 48 will cause extension of the screw threaded member 53 to take up the clearance, the latter element being held against rotation by the washer 59 and compression spring 58. Once the brake pads 15 and 19 engage the rotor braking surface with a predetermined pressure, as set by the spring 69, continued rotation of the cam 23 in the actuating direction will cause the clutch plates 64 and 65 to slip relative to the clutch plate 63. Therefore, over adjustment is prevented.

Assuming that adjustment has been made in the manner aforedescribed, the brake is released by rotating the cam element 23 in the opposite direction. Thus, the cam surfaces 29 and 24 permit the spring 58 to return the cam element 22 to its at rest position along with the nut 48 and threaded member 53. Any tendency for the nut 48 to rotate in an anti-adjusting direction will, however, be prevented by the one-way spring brake 72. Thus, the nut 48 will be maintained in its newly adjusted position relative to the threaded member 53.

EMBODIMENT OF FIG. 6

The embodiment shown in FIG. 6 corresponds generally to the embodiment shown in FIGS. 1 through 5, except in the arrangement of lost motion connection utilized. Those portions of the embodiment shown in FIG. 6 which correspond to similar portions of the embodiment shown in FIGS. 1–5 are designated by a like reference numeral characterized further in that a suffix "a" is affixed thereto.

FIG. 6 shows a type of lost motion connection which can be used to replace the clearance between the tangs 62 and slots 61. In the embodiment shown in FIG. 6, the tangs 62 will substantially fill the slots 62 and the five degrees of lost motion is provided by clearance between the projection 73 of the spring brake 72 and its retaining surfaces in the nonrotatable cam element 22.

Operation of the embodiment shown in FIG. 6 will be similar to that of the device shown in FIGS. 1 through 5 except for the location where the lost motion takes place.

Figure 7:
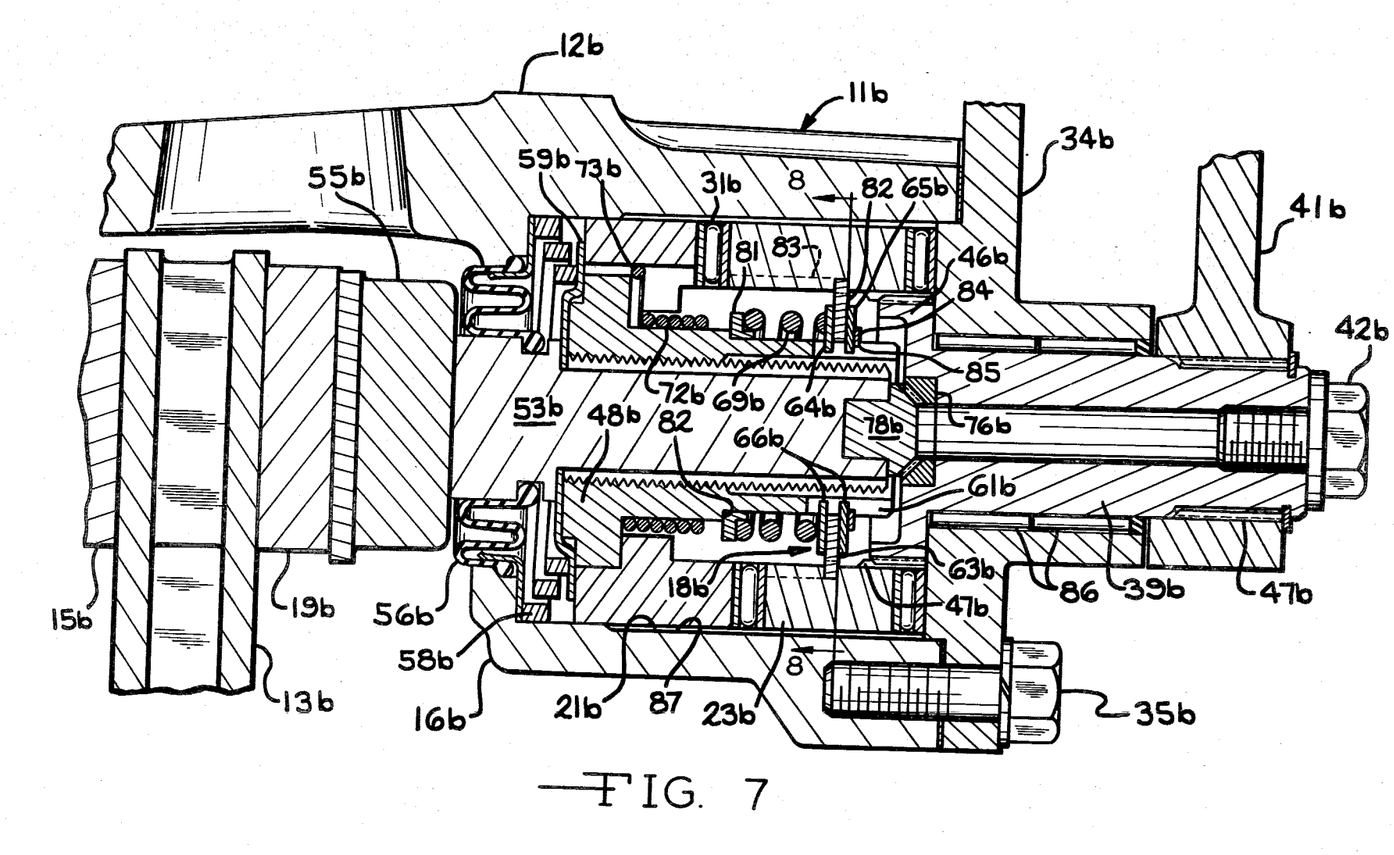
FIG. 7 is a fragmentary longitudinal sectional view similar to FIG. 1, but showing another embodiment of brake structure.
Figure 8:
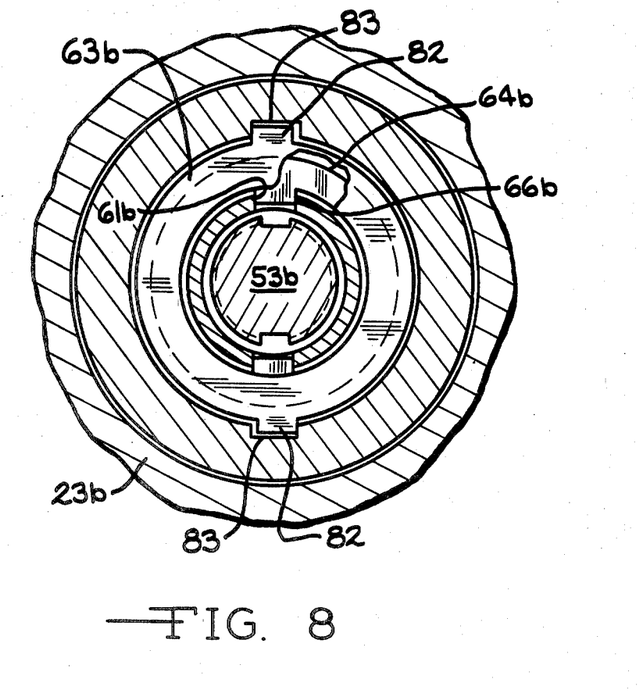
FIG. 8 is a fragmentary enlarged sectional view taken approximately on the line 8—8 of FIG. 7.

EMBODIMENT OF FIGS. 7 AND 8

The embodiment shown in FIGS. 7 and 8 corresponds generally to the embodiments previously described, but differs principally in that the clamping spring for the clutch is positioned on the inner side of the clutch plates instead of the outer side as occurred in the embodiments previously described. Those portions of the embodiments shown in FIGS. 7 and 8 which are similar to corresponding portions of the embodiments shown in FIGS. 1–6 are designated by a like reference numeral characterized further in that a suffix "b" is affixed thereto.

In the embodiment shown in FIGS. 7 and 8, the nut 48b is elongated and the clutch spring 69b is positioned between the inner clutch plate 64b, and an annular spring retainer 81 that in turn is positioned against an outwardly facing shoulder 82 in the nut 48b. In order that the spring 69b will be positioned between two surfaces which do not rotate relative to each other, the clutch plates 64b and 65b are slidably coupled to the nut 48b rather than to the actuating shaft 39b. The inner periphery of the clutch plates 64b and 65b carry tangs 66b that are received in the slot 61b of the nut 48b, while the clutch plate 63b is supplied with tangs 82 on its outer periphery that are received in slots 83 in the inner periphery of the rotary cam member 23b. The actuating shaft member 39b also carries teeth that engage the splined configuration 47b of the cam member 23b. This construction has the advantage that it permits the actuating shaft 39b to have a much shorter annular driving projection 46b than was required in the previously described embodiments.

The clutch discs 64b and 65b are held onto the nut 48b by a snap ring 84 that is positioned outwardly of the clutch plate 65b, and which is received in a groove 85 in the outer end of the nut 48b. Also in the embodiment shown in FIGS. 7 and 8, no collar 54 is used, and the rod 53b has its inner end enlarged to act as the retainer for the dust seal 56b. Also, the sleeve bearing 37 of the previous embodiment is replaced by two roller bearings 86 which, as in the previous embodiment, support and center not only the drive shaft 39b, but hold the cam member 23b out of sliding engagement with the side walls of the bore 21b by reason of the tightly fitting spline 47b. Five degrees of lost motion are provided between the tangs 82 of the clutch plated 63b and the sidewalls of the grooves 83.

In all of the embodiments above described, the side wall of the elongated bore 21 is enlarged slightly as at 87 over the rotary portion of the cam actuator, so that it is held out of sliding engagement with the housing by the actuating shaft 39. The spline 47 between the rotary cam 23, and the annular shaft extention 46 is a tight sliding fit so that the rotary cam 23 is held away from the side walls of the bore 87. On the other hand, the axially driven cam 22 bears against the side walls of the bore 21, and it in turn journals the nut 48 to center the threaded rod 53 relative to the actuating structure. It will further be seen that the construction of the invention seals off the frictional drive mechanisms between the sliding washer 59 and the rotary seal 38 which surrounds the shaft 39, so that the torque developed by the frictional devices does not appreciably change during use. It will further be seen that the device can nevertheless be manually adjusted while the actuator is installed on the vehicle through a passageway through the actuating shaft which is located in the outer end of the housing.

While the invention has been described in considerable detail, I do not wish to be limited to the particular embodiments shown and described, and it is my intention to cover hereby all novel adaptations, modifications, and arrangements thereof, which come within the practice of those skilled in the art to which the invention relates, and which come within the preview of the following claims.

I claim:

1. In a mechanically-actuated disc brake, including a rotor, rotatable about an axis, having a friction surface thereon, friction element means for frictionally engaging said rotor friction surface, a drive assembly including a rotatable helical cam member and an actuating member coaxially positioned within, and rotationally interlocked with, said rotatable cam member, an annular nonrotatable cam member in communication with said drive assembly, whereby upon rotation of said drive assembly, said nonrotatable cam member axially translates in a forward brake-applying direction, a push rod communicating with said friction element means, said push rod coaxially positioned within, and circumscribed by, said rotatable and nonrotatable cam members, an annular nut circumscribing and threadably engaging said push rod, said annular nut having a shank portion, coaxially positioned within said rotatable and nonrotatable cam members, and a radially-projecting flange communicating with said nonrotatable cam member, whereby said nonrotatable cam member urges the combination of said annular nut and push rod in said forward brake-applying direction in response to rotation of said drive assembly, thereby urging said friction element means into engagement with said rotor friction surface, means for biasing the combination of said annular nut and push rod in a rearward brake-releasing direction upon counter-rotation of said drive assembly, the improvement comprising adjusting means for rotating the annular nut relative to said push rod, thereby forwardly advancing said push rod with respect to said annular nut, said adjusting means including plate clutch means circumscribing, and projecting radially from, said annular nut and driven by said drive assembly, lost motion means, whereby said push rod is forwardly advanced with respect to said annular nut after a predetermined rotation of said drive assembly, and one-way brake means for frictionally resisting rearward retraction of said push rod with respect to said annular nut.

2. The improvement according to claim 1, wherein said plate clutch means comprises an annular inner clutch plate frictionally engaged on each side thereof by an annular outer clutch plate, said inner and outer clutch plates radially extending between said annular nut and said actuating member, means for maintaining said outer clutch plates in frictional engagement with said inner clutch plate, and wherein said lost motion means comprises at least one external tang projecting radially outward from each of said outer clutch plates and engaging an axial slot in said actuating member, and at least one internal tang projecting radially inward from said inner clutch plate and engaging an axial slot in said annular nut, the circumferential width of said axial slot in said annular nut being greater than the circumferential width of said internal tang, whereby said annular nut is rotated with respect to said push rod after a predetermined rotation of said drive assembly.

3. The improvement according to claim 1, wherein said plate clutch means comprises an annular inner clutch plate frictionally engaged on each side thereof by an annular outer clutch plate, said inner and outer clutch plates radially extending between said annular nut and said actuating member, means for maintaining said outer clutch plates in frictional engagement with said inner clutch plate, and wherein said lost motion means comprises at least one internal tang projecting radially inward from each of said outer clutch plates and engaging an axial slot in said annular nut, and at least one external tang projecting radially outward from said inner clutch plate and engaging an axial slot in said actuating member, the circumferential width of said axial slot in said actuating member being greater than the circumferential width of said external tang, whereby said annular nut is rotated with respect to said push rod after a predetermined rotation of said drive assembly.

4. The improvement according to claim 1, wherein said plate clutch means comprises an annular inner clutch plate frictionally engaged on each side thereof by an annular outer clutch plate, said inner and outer clutch plates radially extending between said annular nut and said rotatable cam member, means for maintaining said outer clutch plates in frictional engagement with said inner clutch plate, and wherein said lost motion means comprises at least one internal tang projecting radially inward from each of said outer clutch plates and engaging an axial slot in said nut, and at least one external tang projecting radially outward from said inner clutch plate, said external tang engaging an axial slot in said rotatable cam member, the circumferential width of said axial slot in said rotatable cam member being greater than the circumferential width of said external tang, whereby said annular nut is rotated with respect to said push rod after a predetermined rotation of said drive assembly.

5. The improvement according to claim 1, wherein said plate clutch means comprises an annular inner clutch plate frictionally engaged on each side thereof by an annular outer clutch plate, said inner and outer clutch plates radially extending between said annular nut and said actuating member, at least one external tang projecting radially outward from each of said outer clutch plates and engaging an axial slot in said actuating member, at least one internal tang projecting radially inward from said inner clutch plate and engaging an axial slot in said annular nut, means for maintaining said outer clutch plates in frictional engagement with said inner clutch plate, and wherein said one-way brake means comprises a helical spring brake circumscribing at least part of the shank portion of said annular nut, and wherein said lost motion comprises a radial projection on one end of said helical spring brake, said projection engaging an axial slot in said nonrotatable cam member, the circumferential width of said axial slot in said nonrotatable cam member being greater than the circumferential width of said projection, whereby said push rod is forwardly advanced with respect to said annular nut after a predetermined rotation of said drive assembly.

6. In a mechanically-actuated disc brake, including a rotor, rotatable about an axis, having a pair of friction surfaces, one on each side thereof, friction element means in juxtaposed relation with each of said rotor friction surfaces, a caliper having a pair of legs straddling said friction element means, one of said legs having a bore extending axially therethrough, brake-applying means within said bore for urging said friction element means into engagement with said rotor friction surfaces, said brake-applying means including a helical cam assembly in juxtaposed relation with said bore, said helical cam assembly including a rotatable and a nonrotatable cam member, whereby upon rotation of said rotatable cam member, said nonrotatable cam member axially translates in a forward brake-applying direction, a push rod, communicating with said friction element means, having a portion thereof coaxially positioned within, and circumscribed by, said helical cam assembly, an annular nut circumscribing and threadably engaging said push rod, said annular nut having a shank portion, coaxially positioned within said helical cam assembly, and a radially-projecting flange communicating with said nonrotatable cam member, whereby said nonrotatable cam member urges the combination of said annular nut and push rod in said forward brake-applying direction in response to rotation of said rotatable cam member, thereby effecting frictional engagement of said friction element means with said rotor friction surface, means for biasing the combination of said annular nut and push rod in a rearward brake-releasing direction upon counter-rotation of said rotatable cam member, the improvement comprising adjusting means for rotating said annular nut relative to said push rod, thereby forwardly advancing said push rod with respect to said annular nut, said adjusting means including a cylindrical brake actuating member coaxially positioned within said helical cam assembly, circumscribing said annular nut, and rotationally interlocked with said rotatable cam member whereby rotation of said actuating member effects rotation of said rotatable cam member, plate clutch drive means transversely positioned between said cylindrical actuating member and said annular nut, said clutch drive means including lost motion means, whereby said push rod is forwardly advanced with respect to said annular nut in response to a predetermined rotation of said cylindrical actuating member.

7. A mechanically-actuated disc brake, including a rotor, rotatable about an axis, having a pair of friction surfaces, one on each side thereof, friction element means in juxtaposed relation with each of said rotor friction surfaces, a caliper having a pair of legs straddling said friction element means, one of said legs having a bore extending axially therethrough, brake-applying means within said bore for urging said friction element means into engagement with said rotor friction surfaces, said brake-applying means including a helical cam assembly in juxtaposed relation with said bore, said helical cam assembly including a rotatable and a nonrotatable cam member, whereby upon rotation of said rotatable cam member, said nonrotatable cam member axially translates in a forward brake-applying direction, a push rod communicating with said friction element means, having a portion thereof coaxially positioned within, and circumscribed by, said helical cam assembly, an annular nut circumscribing and threadably engaging said push rod, said annular nut having a shank portion, coaxially positioned within said helical cam assembly, and a radially-projecting flange communicating with said nonrotatable cam member, whereby said nonrotatable cam member urges the combination of said annular nut and push rod in said forward brake-applying direction in response to rotation of said rotatable cam member, thereby effecting frictional engagement of said friction element means with said rotor friction surface, means for biasing the combination of said annular nut and push rod in a rearward brake-releasing direction, upon counter-rotation of said rotatable cam member, adjusting means for rotating said annular nut relative to said push rod thereby forwardly advancing said push rod with respect to said nut, said adjusting means including a cylindrical brake actuating member coaxially positioned within said helical cam assembly and circumscribing said annular nut, and rotationally interlocked with said rotatable cam member whereby rotation of said actuating member effects rotation of said rotatable cam member, plate clutch means for rotating said annular nut with respect to said push rod in response to rotation of said cylindrical actuating member, said plate clutch means including an annular inner clutch plate frictionally engaged on each side thereof by an annular outer clutch plate, said inner and outer clutch plates circumscribing said annular nut, each of said outer clutch plates including at least one external tang projecting radially outward and engaging an axial slot in said cylindrical actuating member, said inner clutch plate including at least one internal tang projecting radially inward and engaging an axial slot in said annular nut, the circumferential width of said axial slot in said annular nut being greater than the circumferential width of said internal tang whereby said annular nut is rotated with respect to said push rod after a predetermined rotation of said cylindrical actuating member, clutch biasing means for maintaining said outer clutch plates in frictional engagement with said inner clutch plate, a one-way spring brake helically circumscribing said shank portion of said nut and in frictional engagement therewith, one end of said one-way spring brake being rotationally fixed to said nonrotatable cam member, thereby allowing said annular nut to rotate so as to forwardly advance said push rod and frictionally resisting counter-rotation of said annular nut.

8. The mechanically-actuated disc brake according to claim 7, wherein said cylindrical actuating member includes a rearwardly-protruding shaft, having a hollow axial passageway therethrough communicating with the inside of said cylindrical actuating member and wherein said adjusting means includes means for manually rotating said push rod with respect to said annular nut, whereby said push rod is selectively advanced in said forward direction, or retracted in said rearward direction, relative to said annular nut, said manual means including an annular ring coaxially fixed within said cylindrical actuating member, said annular ring having internal teeth thereon, an abutment member having one-way ratchet teeth and torque-transmitting means thereon, said abutment member being coaxially fixed to said push rod, whereby a torque tool may be inserted through said axial passageway in said shaft to engage said torque-transmitting means and rotate said push rod with respect to said annular nut thereby selectively advancing or retracting said push rod, said one-way ratchet teeth being oriented such that said push rod may be manually retracted until said one-way ratchet teeth engage said internal teeth on said annular ring.

9. The mechanically-actuated disc brake according to claim 7, further comprising a washer rotationally fixed to said push rod and having an outer portion frictionally engaging said nonrotatable cam member so as to frictionally resist rotation of said push rod with respect to said nonrotatable cam member.

10. A mechanically-actuated disc brake, including a rotor, rotatable about an axis, having a pair of friction surfaces, one on each side thereof, friction element means in juxtaposed relation with each of said rotor friction surfaces, a caliper having a pair of legs straddling said friction element means, one of said legs having a bore extending axially therethrough, brake-applying means within said bore for urging said friction element means into engagement with said rotor friction surfaces, said brake-applying means including a helical cam assembly in juxtaposed relation with said bore, said helical cam assembly including a rotatable and a nonrotatable cam member, whereby upon rotation of said rotatable cam member, said nonrotatable cam member axially translates in a forward brake-applying direction, a push rod communicating with said friction element means, having a portion thereof coaxially positioned within, and circumscribed by, said helical cam assembly, an annular nut circumscribing and threadably engaging said push rod, said annular nut having a shank portion, coaxially positioned within said helical cam assembly, and a radially-projecting flange communicating with said nonrotatable cam member, whereby said nonrotatable cam member urges the combination of said annular nut and push rod in said forward brake-applying direction in response to rotation of said rotatable cam member, thereby effecting frictional engagement of said friction element means with said rotor friction surface, means for biasing the combination of said annular nut and push rod in a rearward brake-releasing direction, upon counter-rotation of said rotatable cam member, adjusting means for rotating said annular nut relative to said push rod thereby forwardly advancing said push rod with respect to said nut, said adjusting means including a cylindrical brake actuating member coaxially positioned within said helical cam assembly, circumscribing said annular nut, and rotationally interlocked with said rotatable cam member whereby rotation of said actuating member effects rotation of said rotatable cam member, plate clutch means for rotating said annular nut with respect to said push rod in response to rotation of said cylindrical brake actuating member, said plate clutch means including an annular inner clutch plate frictionally engaged on each side thereof by an annular outer clutch plate, said inner and outer clutch plates circumscribing said annular nut, each of said outer clutch plates including at least one internal tang projecting radially inward and engaging an axial slot in said annular nut, said inner clutch plate including at least one external tang projecting radially outward and engaging an axial slot in said cylindrical actuating member, the circumferential width of said axial slot in said cylindrical actuating member being greater than the circumferential width of said external tang whereby said annular nut is rotated with respect to said push rod after a predetermined rotation of said cylindrical actuating member, clutch biasing means for maintaining said outer clutch plates in frictional engagement with said inner clutch plate, a one-way spring brake helically circumscribing said shank portion of said nut and in frictional engagement therewith, one end of said one-way spring brake being rotationally fixed to said nonrotatable cam member, thereby allowing said annular nut to rotate so as to forwardly advance said push rod and frictionally resisting counter-rotation of said annular nut.

11. The mechanically-actuated disc brake according to claim 10, wherein said cylindrical actuating member includes a rearwardly-protruding shaft, having a hollow axial passageway therethrough communicating with the inside of said cylindrical actuating member and wherein said adjusting means includes means for manually rotating said push rod with respect to said annular nut, whereby said push rod is selectively advanced in said forward direction, or retracted in said rearward direction, relative to said annular nut, said manual means including an annular ring coaxially fixed within said cylindrical actuating member, said annular ring having internal teeth thereon, an abutment member having one-way ratchet teeth and torque-transmitting means thereon, said abutment member being coaxially fixed to said push rod, whereby a torque tool may be inserted through said axial passageway in said shaft to engage said torque-transmitting means and rotate said push rod with respect to said annular nut thereby selectively advancing or retracting said push rod, said one-way ratchet teeth being oriented such that said push rod may be manually retracted until said one-way ratchet teeth engge said internal teeth on said annular ring.

12. The mechanically-actuated disc brake according to claim 10, further comprising a washer rotationally fixed to said push rod and having an outer portion frictionally engaging said nonrotatable cam member so as to frictionally resist rotation of said push rod with respect to said nonrotatable cam member.

13. A mechanically-actuated disc brake, including a rotor, rotatable about an axis, having a pair of friction surfaces, one on each side thereof, friction element means in juxtaposed relation with each of said rotor friction surfaces, a caliper having a pair of legs straddling said friction element means, one of said legs having a bore extending axially therethrough, brake-applying means within said bore for urging said friction element means into engagement with said rotor friction surfaces, said brake-applying means including a helical cam assembly in juxtaposed relation with said bore, said helical cam assembly including a rotatable and a nonrotatable cam member, whereby upon rotation of said rotatable cam member, said nonrotatable cam member axially translates in a forward brake-applying direction, a push rod communicating with said friction element means, having a portion thereof coaxially positioned within, and circumscribed by, said helical cam assembly, an annular nut circumscribing and threadably engaging said push rod, said annular nut having a shank portion, coaxially positioned within said helical cam assembly, and a radially-projecting flange communicating with said nonrotatable cam member, whereby said nonrotatable cam member urges the combination of said annular nut and push rod in said forward brake-applying direction in response to rotation of said rotatable cam member, thereby effecting frictional engagement of said friction element means with said rotor friction surface, means for biasing the combination of said annular nut and push rod in a rearward brake-releasing direction upon counter-rotation of said rotatable cam member, adjusting means for rotating said annular nut relative to said push rod thereby forwardly advancing said push rod with respect to said nut, said adjusting means including a cylindrical brake actuating member coaxially positioned within said helical cam assembly, circumscribing said annular nut, and rotationally interlocked with said rotatable cam member whereby rotation of said actuating member effects rotation of said rotatable cam member, plate clutch means for rotating said annular nut with respect to said push rod in response to rotation of said cylindrical actuating member, said plate clutch means including an annular inner clutch plate frictionally engaged on each side thereof by an annular outer clutch plate, said inner and outer clutch plates circumscribing said annular nut, each of said outer clutch plates including at least one external tang projecting radially outward engaging an axial slot in said cylindrical actuating member, said inner clutch plate including at least one internal tang projecting radially inward and engaging an axial slot in said annular nut, clutch biasing means for maintaining said outer clutch plates in frictional engagement with said inner clutch plate, a one-way spring brake helically circumscribing said shank portion of said nut and in frictional engagement therewith, one end of said one-way spring brake having a radial projection thereon, said projection engaging an axial slot in said nonrotatable cam member, the circumferential width of said axial slot in said nonrotatable cam member being greater than the circumferential width of said projection, whereby said push rod is forwardly advanced with respect to said annular nut after a predetermined rotation of said cylindrical actuating member, thereby allowing said annular nut to rotate so as to forwardly advance said push rod and frictionally resisting counter-rotation of said annular nut.

14. The mechanically-actuated disc brake according to claim 13, wherein said cylindrical actuating member includes a rearwardly-protruding shaft, having a hollow axial passageway therethrough communicating with the inside of said cylindrical actuating member and wherein said adjusting means includes means for manually rotating said push rod with respect to said annular nut, whereby said push rod is selectively advanced in said forward direction, or retracted in said rearward direction, relative to said annular nut, said manual means including an annular ring coaxially fixed within said cylindrical actuating member, said annular ring have internal teeth thereon, an abutment member having one-way ratchet teeth and torque-transmitting means thereon, said abutment member being coaxially fixed to said push rod, whereby a torque tool may be inserted through said axial passageway in said shaft to engage said torque-tramsmitting means and rotate said push rod with respect to said annular nut thereby selectively advancing or retracting said push rod, said one-way ratchet teeth being oriented such that said push rod may be manually retracted until said one-way ratchet teeth engage said internal teeth on said annular ring.

15. The mechanically-actuated disc brake according to claim 13, further comprising a washer rotationally fixed to said push rod and having an outer portion frictionally engaging said nonrotatable cam member so as to frictionally resist rotation of said push rod with respect to said nonrotatable cam member.

16. In a mechanically-actuated disc brake, including a rotor, rotatable about an axis, having a pair of friction surfaces, one on each side thereof, friction element means in juxtaposed relation with each of said rotor friction surfaces, a caliper having a pair of legs straddling said friction element means, one of said legs having a bore extending axially therethrough, brake-applying means within said bore for urging said friction element means into engagement with said rotor friction surfaces, said brake-applying means including helical cam assembly in juxtaposed relation with said bore, said helical cam assembly including a rotatable and a nonrotatable cam member, whereby upon rotation of said rotatable cam member, said nonrotatable cam member axially translates in a forward brake-applying direction, a push rod, communicating with said friction element means, having a portion thereof coaxially positioned within, and circumscribed by, said helical cam assembly, an annular nut circumscribing and threadably engaging said push rod, said annular nut having a shank portion, coaxially positioned within said helical cam assembly, and a radially-projecting flange communicating with said nonrotatable cam member, whereby said nonrotatable cam member urges the combination of said annular nut and push rod in said forward brake-applying direction in response to rotation of said rotatable cam member, thereby effecting frictional engagement of said friction element means with said rotor friction surface, and means for biasing the combination of said annular nut and push rod in a rearward brake-releasing direction upon counter-rotation of said rotatable cam member, the improvement comprising adjusting means for rotating said annular nut relative to said push rod, thereby forwardly advancing said push rod with respect to said annular nut, said adjusting means including a brake actuating member rotationally interlocked with said rotatable cam member whereby rotation of said brake actuating member effects rotation of said rotatable cam member, plate clutch drive means transversely positioned between said rotatable cam member and said annular nut, said clutch drive means including lost motion means, whereby said push rod is forwardly advanced with respect to said annular nut in response to a predetermined rotation of said brake actuating member.

17. A mechanically-actuated disc brake, including a rotor, rotatable about an axis, having a pair of friction surfaces, one on each side thereof, friction element means in juxtaposed relation with each of said rotor friction surfaces, a caliper having a pair of legs straddling said friction element means, one of said legs having a bore extending axially therethrough, brake-applying means within said bore for urging said friction element means into engagement with said rotor friction surfaces, said brake-applying means including a helical cam assembly in juxtaposed relation with said bore, said helical cam assembly including a rotatable and a nonrotatable cam member, whereby upon rotation of said rotatable cam member, said nonrotatable cam member axially translates in a forward brake-applying direction, a push rod communicating with said friction element means, having a portion thereof coaxially positioned within, and circumscribed by, said helical cam assembly, an annular nut circumscribing and threadably engaging said push rod, said annular nut having a shank portion, coaxially positioned within said helical cam assembly, and a radially-projecting flange communicating with said nonrotatable cam member, whereby said nonrotatable cam member urges the combination of said annular nut and push rod in said forward brake-applying direction in response to rotation of said rotatable cam member, thereby effecting frictional engagement of said friction element means with said rotor friction surface, means for biasing the combination of said annular nut and push rod in a rearward brake-releasing direction, upon counter-rotation of said rotatable cam member, adjusting means for rotating said annular nut relative to said push rod thereby forwardly advancing said push rod with respect to said nut, said adjusting means including a brake actuating member rotationally interlocked with said rotatable cam member whereby rotation of said brake actuating member effects rotation of said rotatable cam member, plate clutch means for rotating said annular nut with respect to said push rod in response to rotation of said rotatable cam member, said plate clutch means including an annular inner clutch plate frictionally engaged on each side thereof by an annular outer clutch plate, said inner and outer clutch plates circumscribing said annular nut, each of said outer clutch plates including at least one internal tang projecting radially inward and engaging an axial slot in said annular nut, said inner clutch plate including at least one external tang projecting radially outward and engaging an axial slot in said rotatable cam member, the circumferential width of said axial slot in said rotatable cam member being greater than the circumferential width of said external tang whereby said annular nut is rotated with respect to said push rod after a predetermined rotation of said brake actuating member, clutch biasing means for maintaining said outer clutch plates in frictional engagement with said inner clutch plate, a one-way spring brake helically circumscribing said shank portion of said nut and in frictional engagement therewith, one end of said one-way spring brake being rotationally fixed to said nonrotatable cam member, thereby allowing said annular nut to rotate so as to forwardly advance said push rod and frictionally resisting counter-rotation of said annular nut.

18. The mechanically-actuated disc brake according to claim 17, wherein said brake actuating member includes a rearwardly-protruding shaft, having a hollow axial passageway therethrough communicating with the inside of said brake actuating member and wherein said adjusting means includes means for manually rotating said push rod with respect to said annular nut, whereby said push rod is selectively advanced in said forward direction, or retracted in said rearward direction, relative to said annular nut, said manual means including an annular ring coaxially fixed within said brake actuating member, said annular ring having internal teeth thereon, an abutment member having one-way ratchet teeth and torque-transmitting means thereon, said abutment member being coaxially fixed to said push rod, whereby a torque tool may be inserted through said axial passageway in said shaft to engage said torque-transmitting means and rotate said push rod with respect to said annular nut thereby selectively advancing or retracting said push rod, said one-way ratchet teeth being oriented such that said push rod may be manually retracted until said one-way ratchet teeth engage said internal teeth on said annular ring.

19. The mechanically-actuated disc brake according to claim 17, further comprising a washer rotationally fixed to said push rod and having an outer portion frictionally engaging said nonrotatable cam member so as to frictionally resist rotation of said push rod with respect to said nonrotatable cam member.

* * * * *